US011845428B2

(12) United States Patent
Kim et al.

(10) Patent No.: US 11,845,428 B2
(45) Date of Patent: Dec. 19, 2023

(54) SYSTEM AND METHOD FOR LANE DEPARTURE WARNING WITH EGO MOTION AND VISION

(71) Applicant: Canoo Technologies Inc., Torrance, CA (US)

(72) Inventors: Kilsoo Kim, Hermosa Beach, CA (US); Jongmoo Choi, Gardena, CA (US); Siddharth Agarwal, Torrance, CA (US); Mayukh Sattiraju, Redondo Beach, CA (US); Lei Cao, Torrance, CA (US); Dheemanth Uppalapati, Marina Del Rey, CA (US); Aviral Singh, Torrance, CA (US); David R. Arft, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 114 days.

(21) Appl. No.: 17/305,706

(22) Filed: Jul. 13, 2021

(65) Prior Publication Data
US 2023/0029533 A1  Feb. 2, 2023

(51) Int. Cl.
*B60W 30/12* (2020.01)
*B60W 50/00* (2006.01)
(Continued)

(52) U.S. Cl.
CPC ............ *B60W 30/12* (2013.01); *B60W 10/18* (2013.01); *B60W 10/20* (2013.01);
(Continued)

(58) Field of Classification Search
CPC ...... B60W 30/12; B60W 10/18; B60W 10/20; B60W 50/0097; B60W 50/14;
(Continued)

(56) References Cited

U.S. PATENT DOCUMENTS 6,675,094 B2   1/2004  Russell et al.
9,352,778 B2   5/2016  Yoon et al.
(Continued)

FOREIGN PATENT DOCUMENTS

CN   109740469 A   5/2019
CN   111344646 A   6/2020
(Continued)

OTHER PUBLICATIONS

Chanyoung et al., "Time-to-Line Crossing Enhanced End-to-End Autonomous Driving Framework," 2020, Publisher: IEEE.*
(Continued)

*Primary Examiner* — Tuan C To

(57) ABSTRACT

An apparatus includes at least one camera configured to capture at least one image of a traffic lane, an inertial measurement unit (IMU) configured to detect motion characteristics, and at least one processor. The at least one processor is configured to obtain a vehicle motion trajectory using the IMU and based on one or more vehicle path prediction parameters, obtain a vehicle vision trajectory based on the at least one image, wherein the vehicle vision trajectory includes at least one lane boundary, determine distances between one or more points on the vehicle and one or more intersection points of the at least one lane boundary based on the obtained vehicle motion trajectory, determine at least one time to line crossing (TTLC) based on the determined distances and a speed of the vehicle, and activate a lane departure warning indicator based on the determined at least one TTLC.

18 Claims, 9 Drawing Sheets

(51) Int. Cl.
*B60W 10/18* (2012.01)
*B60W 10/20* (2006.01)
*B60W 50/14* (2020.01)
*G06T 7/246* (2017.01)

(52) U.S. Cl.
CPC ........ *B60W 50/0097* (2013.01); *B60W 50/14* (2013.01); *G06T 7/246* (2017.01); *B60W 2420/42* (2013.01); *B60W 2552/53* (2020.02); *B60W 2710/18* (2013.01); *B60W 2710/20* (2013.01); *G06T 2207/20164* (2013.01); *G06T 2207/30241* (2013.01); *G06T 2207/30256* (2013.01)

(58) Field of Classification Search
CPC ........ B60W 2552/53; B60W 2420/42; B60W 2710/18; B60W 2710/20; G06T 7/246; G06T 2207/20164; G06T 2207/30241; G06T 2207/30256
USPC ........................................................ 701/25
See application file for complete search history.

(56) References Cited

U.S. PATENT DOCUMENTS

| | | | |
|---|---|---|---|
| 9,595,197 | B2 | 3/2017 | Lee |
| 10,227,039 | B1 | 3/2019 | Prasad |
| 11,104,336 | B2 | 8/2021 | Lin et al. |
| 11,237,562 | B2 | 2/2022 | Schultz et al. |
| 11,260,757 | B2 | 3/2022 | Degand et al. |
| 11,328,593 | B2 | 5/2022 | Urano et al. |
| 11,535,274 | B2 | 12/2022 | Dingli et al. |
| 2003/0229438 | A1 | 12/2003 | Hac |
| 2004/0164851 | A1 | 8/2004 | Crawshaw |
| 2008/0071451 | A1 | 3/2008 | Yamaguchi et al. |
| 2009/0021358 | A1 | 1/2009 | Lee et al. |
| 2009/0030613 | A1 | 1/2009 | Kataoka et al. |
| 2009/0037062 | A1 | 2/2009 | Lee et al. |
| 2009/0157263 | A1 | 6/2009 | Shin |
| 2009/0284360 | A1* | 11/2009 | Litkouhi ............ B60Q 9/00 340/439 |
| 2010/0172542 | A1 | 7/2010 | Stein et al. |
| 2010/0182139 | A1 | 7/2010 | Chen et al. |
| 2012/0022739 | A1 | 1/2012 | Zeng |
| 2012/0050074 | A1 | 3/2012 | Bechtel et al. |
| 2013/0190982 | A1* | 7/2013 | Nakano ............ B62D 15/025 701/41 |
| 2013/0190985 | A1* | 7/2013 | Nakano ............ B62D 6/00 701/41 |
| 2013/0261898 | A1 | 10/2013 | Fujita et al. |
| 2013/0321172 | A1 | 12/2013 | Igarashi et al. |
| 2013/0335213 | A1 | 12/2013 | Sherony et al. |
| 2013/0345900 | A1 | 12/2013 | Usui |
| 2014/0002655 | A1 | 1/2014 | Woo et al. |
| 2014/0236428 | A1 | 8/2014 | Akiyama |
| 2015/0149037 | A1 | 5/2015 | Lim et al. |
| 2015/0314783 | A1 | 11/2015 | Nespolo et al. |
| 2017/0010618 | A1 | 1/2017 | Shashua et al. |
| 2017/0313253 | A1* | 11/2017 | Hughes ............ G06V 20/588 |
| 2018/0024238 | A1* | 1/2018 | Khlifi ............ G01S 13/931 342/52 |
| 2018/0024562 | A1 | 1/2018 | Bellaiche |
| 2018/0025235 | A1 | 1/2018 | Fridman |
| 2018/0141528 | A1 | 5/2018 | Oh et al. |
| 2018/0150700 | A1* | 5/2018 | Kaneko ............ B60W 30/12 |
| 2018/0186378 | A1* | 7/2018 | Zhuang ............ G01C 21/3446 |
| 2018/0237007 | A1* | 8/2018 | Adam ............ B60W 50/14 |
| 2018/0307236 | A1 | 10/2018 | Reed |
| 2019/0072973 | A1 | 3/2019 | Sun et al. |
| 2019/0202453 | A1 | 7/2019 | Farooqi et al. |
| 2019/0283748 | A1 | 9/2019 | Hajika |
| 2019/0384294 | A1 | 12/2019 | Shashua et al. |
| 2019/0389470 | A1 | 12/2019 | Zarringhalam et al. |
| 2020/0079372 | A1 | 3/2020 | Hajika |
| 2020/0272835 | A1 | 8/2020 | Cheng et al. |
| 2020/0339079 | A1 | 10/2020 | Ohmura |
| 2020/0377088 | A1* | 12/2020 | Fukushige ......... G01C 21/3407 |
| 2020/0379461 | A1* | 12/2020 | Singh .................. G06N 3/044 |
| 2021/0171042 | A1 | 6/2021 | Hayakawa et al. |
| 2021/0197858 | A1* | 7/2021 | Zhang ............... B60W 30/0956 |
| 2021/0221364 | A1* | 7/2021 | Mase .............. B60W 30/18163 |
| 2021/0229708 | A1 | 7/2021 | Kondo et al. |
| 2021/0366144 | A1 | 11/2021 | Magistri et al. |
| 2022/0082403 | A1 | 3/2022 | Shapira et al. |
| 2022/0089219 | A1* | 3/2022 | Takebayashi ........ B62D 15/025 |
| 2022/0097697 | A1 | 3/2022 | Wang et al. |
| 2022/0212670 | A1 | 7/2022 | Aoki et al. |
| 2022/0266852 | A1* | 8/2022 | Khayyer ............ G01C 21/3691 |
| 2022/0363250 | A1 | 11/2022 | Varunjikar et al. |

FOREIGN PATENT DOCUMENTS

| | | | |
|---|---|---|---|
| CN | 109740469 B | 1/2021 | |
| DE | 10333670 B4 | 7/2019 | |
| EP | 3342666 A1 * | 7/2018 | .......... B60W 30/095 |
| EP | 3342666 A1 | 7/2018 | |
| EP | 3805073 A1 | 4/2021 | |
| GB | 2550256 A * | 11/2017 | ............... B60R 1/00 |
| GB | 2550256 A | 11/2017 | |
| IN | 202014005110 A | 8/2020 | |
| JP | 2009-020854 A | 1/2009 | |
| JP | 5187171 B2 | 4/2013 | |
| JP | 2018-203173 A | 12/2018 | |
| JP | 2021-503414 A | 2/2021 | |
| WO | 2019099622 A1 | 5/2019 | |
| WO | WO-2019099622 A1 * | 5/2019 | ............. G01S 17/89 |

OTHER PUBLICATIONS

S. Mammar et al., "Time-to-line crossing and vehicle dynamics for lane departure avoidance," 2004, Publisher: IEEE.*
Non-final Office Action dated Sep. 29, 2022, in connection with U.S. Appl. No. 17/305,702, 13 pages.
International Search Report and Written Opinion of the International Search Authority dated Sep. 30, 2022, in connection with International Application No. PCT/US2022/037008, 7 pages.
International Search Report and Written Opinion of the International Search Authority dated Nov. 16, 2022, in connection with International Application No. PCT/US2022/037000, 8 pages.
International Search Report and Written Opinion of the International Search Authority dated Nov. 15, 2022, in connection with International Application No. PCT/US2022/037011, 8 pages.
International Search Report and Written Opinion of the International Search Authority dated Nov. 18, 2022, in connection with International Application No. PCT/US2022/037013, 9 pages.
International Search Report and Written Opinion of the International Search Authority dated Nov. 18, 2022, in connection with International Application No. PCT/US2022/037015, 8 pages.
International Search Report and Written Opinion of the International Search Authority dated Nov. 15, 2022, in connection with International Application No. PCT/US2022/037016, 9 pages.
Baek, et al., "Practical Approach for Developing Lateral Motion Control of Autonomous Lane Change System," Applied Sciences 2020, 10, 3143, Apr. 2020, 15 pages.
Lian et al. "Cornering Stiffness and Sideslip Angle Estimation Based on Simplified Lateral Dynamic Models for Four-in-Wheel-Motor-Driven Electric Vehicles with Lateral Tire Force Information," International Journal of Automotive Technology, vol. 16, No. 4, 2015, 15 pages.
Pereira, et al., "Cornering stiffness estimation using Levenberg-Marquardt approach," Inverse Problems in Science and Engineering, vol. 29, 2021—Issue 12, May 2021, 55 pages.
Sierra et al., "Cornering stiffness estimation based on vehicle later dynamics," Vehicle System Dynamics, vol. 44, Supplement, 2006, 15 pages.
Weon, et al., "Lane Departure Detecting with Classification of Roadway Based on Bezier Curve Fitting Using DGPS/GIS," Technical Gazette 28 1(2021), Feb. 2021, 8 pages.

(56) References Cited

OTHER PUBLICATIONS

Bouhoute, Afaf, et al., "On the Application of Machine Learning for Cut-In Maneuver Recognition in Platooning Scenarios", 2020 IEEE 91st Vehicular Technology Conference (VTC2020-Spring), 2020, 5 pages.
Heinemann, Tonja, "Predicting Cut-Ins in Traffic Using a Neural Network", Masters thesis in Systems, Control and Mechatronics, Chalmers University of Technology, Department of Electrical Engineering, Gothenburg, Sweden, 2017, 62 pages.
Bar Hillel, Aharon, et al., "Recent Progress in Road and Lane Detection: A Survery", Machine Vision and Applications, Apr. 2014, 20 pages.
Morris, Brendan, et al., "Lane Change Intent Prediction for Driver Assistance: On-Road Design and Evaluation", 2011 IEEE Intelligent Vehicles Symposium (IV), Baden-Baden, Germany, Jun. 5-9, 2011, 8 pages.
Narote, S.P., et al., "A Review of Recent Advances in Lane Detection and Departure Warning System", Pattern Recognition, vol. 73, Jan. 2018, 50 pages.
Final Office Action dated Feb. 23, 2023, in connection with U.S. Appl. No. 17/305,702, 10 pages.
Non-final Office Action dated Jan. 18, 2023, in connection with U.S. Appl. No. 17/305,701, 9 pages.
Final Office Action dated Jun. 23, 2023, in connection with U.S. Appl. No. 17/305,701, 13 pages.
Notice of Allowance dated Jun. 29, 2023, in connection with U.S. Appl. No. 17/305,702, 9 pages.
Non-final Office Action dated Jun. 30, 2023, in connection with U.S. Appl. No. 17/305,705, 12 pages.
Non-final Office Action dated Mar. 28, 2023, in connection with U.S. Appl. No. 17/305,704, 14 pages.
Non-final Office Action dated Apr. 25, 2023, in connection with U.S. Appl. No. 17/305,703, 17 pages.
Notice of Allowance dated Aug. 3, 2023, in connection with U.S. Appl. No. 17/305,702, 8 pages.
Non-final Office Action dated Aug. 24, 2023, in connection with U.S. Appl. No. 17/305,701, 12 pages.
Final Office Action dated Sep. 8, 2023, in connection with U.S. Appl. No. 17/305,704, 15 pages.
Notice of Allowance dated Oct. 18, 2023, in connection with U.S. Appl. No. 17/305,703, 11 pages.
Notice of Allowance dated Oct. 18, 2023, in connection with U.S. Appl. No. 17/305,705, 11 pages.

* cited by examiner

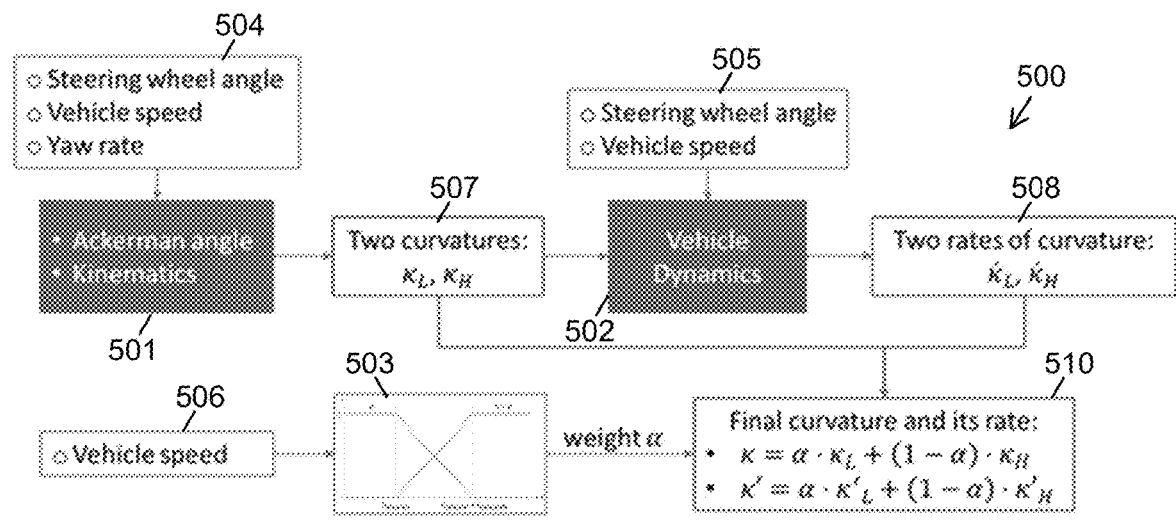
FIG. 5
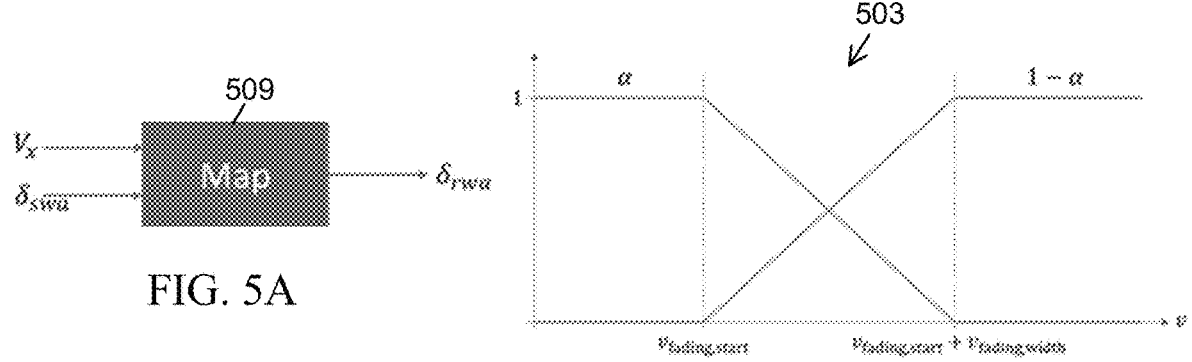
FIG. 5A
FIG. 5B

SYSTEM AND METHOD FOR LANE DEPARTURE WARNING WITH EGO MOTION AND VISION

CROSS-REFERENCE TO RELATED APPLICATIONS

This application is related to the subject matter of: U.S. patent application Ser. No. 17/305,701 filed Jul. 13, 2021 and entitled SYSTEM AND METHOD IN THE PREDICTION OF TARGET VEHICLE BEHAVIOR BASED ON IMAGE FRAME AND NORMALIZATION; U.S. patent application Ser. No. 17/305,702 filed Jul. 13, 2021 and entitled SYSTEM AND METHOD IN DATA-DRIVEN VEHICLE DYNAMIC MODELING FOR PATH-PLANNING AND CONTROL; U.S. patent application Ser. No. 17/305,703 filed Jul. 13, 2021 and entitled SYSTEM AND METHODS OF INTEGRATING VEHICLE KINEMATICS AND DYNAMICS FOR LATERAL CONTROL FEATURE AT AUTONOMOUS DRIVING; U.S. patent application Ser. No. 17/305,704 filed Jul. 13, 2021 and entitled SYSTEM AND METHOD IN VEHICLE PATH PREDICTION BASED ON FULL NONLINEAR KINEMATICS; and U.S. patent application Ser. No. 17/305,705 filed Jul. 13, 2021 and entitled SYSTEM AND METHOD IN LANE DEPARTURE WARNING WITH FULL NONLINEAR KINEMATICS AND CURVATURE. The content of the above-identified patent documents is incorporated herein by reference.

TECHNICAL FIELD

This disclosure relates generally to vehicle driver assist or autonomous driving systems. More specifically, this disclosure relates to lane departure detection and warning with ego motion and vision.

BACKGROUND

Advanced driving assist system (ADAS) features, which use automated technology to assist the vehicle operator in driving and parking, form a foundation for autonomous driving (AD). Determination of vehicle position information and/or detection of nearby objects enables features such as: collision detection and avoidance for adaptive cruise control (ACC), emergency braking; blind spot detection for collision warning and/or evasive steering; lane detection for lane keeping and/or centering, lane changing, or lane departure warning; and path planning and control. Other ADAS and AD features may also be implemented using the same sensor set(s).

Electric vehicles (EVs) are often capable of higher driving and handling performance relative to conventional vehicles. EV designs can include low centers of gravity, independent steering, and immediate, quick, and smooth acceleration. As a result, ADAS and AD features for EVs can involve different considerations than those for conventional vehicles.

SUMMARY

Vehicle lane departure detection and LDW, within the vehicle's ADAS or AD features, is improved in ways suitable to EVs having higher driving and handling performance. Predicted path curvature is calculated based on assumption of both low vehicle speed and high vehicle speed, and the two path curvatures and corresponding derived rates of curvature are combined in a weighted manner based on the vehicle's current speed. The weighted combinations of predicted path curvature and rate more accurately predict the vehicle's path. Combining vehicle path predictions with vehicle vision provides an improved and more accurate lane departure warning. The improved lane departure warning helps accurately predict and warn of lane departure without false positives even during high performance maneuvers, so that vehicle planning and control may optionally take control of at least vehicle steering and/or braking for a corrective action.

In one aspect, an apparatus comprises at least one camera configured to capture at least one image of a traffic lane in front of a vehicle, an inertial measurement unit (IMU) configured to detect motion characteristics of the vehicle, and at least one processor. The at least one processor is configured to obtain a vehicle motion trajectory using the IMU and based on one or more vehicle path prediction parameters, obtain a vehicle vision trajectory based on the at least one image, wherein the vehicle vision trajectory includes at least one lane boundary for a segment of the traffic lane occupied by the vehicle, determine distances between one or more points on the vehicle and one or more intersection points of the at least one lane boundary based on the obtained vehicle motion trajectory, determine at least one time to line crossing (TTLC) based on the determined distances and a speed of the vehicle, and activate a lane departure warning indicator based on the determined at least one TTLC.

In some embodiments, to obtain the vehicle motion trajectory includes, the at least one processor is further configured to determine first parameters for predicting a path of the vehicle, determine second parameters for predicting the path of the vehicle, and predict the path of the vehicle using a combination of the first parameters and the second parameters, wherein the combination is weighted based on the speed of the vehicle.

In some embodiments, the first parameters comprise a first path curvature for predicting the path of the vehicle and a first rate of the first path curvature and the second parameters comprise a second path curvature for predicting the path of the vehicle and a second rate of the second path curvature.

In some embodiments, the weighted combination weights the first parameters using a weight $\alpha$ and weights the second parameters using a weight $1-\alpha$.

In some embodiments, the weight $\alpha$ is applied to the first parameters for vehicle speeds below a first threshold and the weight $1-\alpha$ is applied to the second parameters for vehicle speeds above a second threshold.

In some embodiments, the first parameters comprise a first path curvature $\kappa_L$ and a first rate $\kappa'_L$, the second parameters comprise a second path curvature $\kappa_H$ and a second rate $\kappa'_H$, the first path curvature $\kappa_L$ and the second path curvature $\kappa_H$ are combined according to $K = \alpha \cdot \kappa_L + (1-\alpha) \cdot \kappa_H$, and the first rate $\kappa'_L$ and the second rate $\kappa'_H$ are combined according to $\kappa' = \alpha \cdot \kappa'_L + (1-\alpha) \cdot \kappa'_H$.

In some embodiments, to determine the at least one TTLC, the at least one processor is further configured to determine a plurality of TTLCs each based on a distance between one of the one or more points on the vehicle and one of the one or more intersection points of the at least one lane boundary, and to activate the lane departure warning indicator, the at least one processor is further configured to compare a threshold with a combination of the plurality of TTLCs with applied weighting factors.

In some embodiments, the one or more points on the vehicle include a left corner point, a center point, and a right corner point.

In some embodiments, vehicle comprising the apparatus comprises a motor configured to drive wheels of the vehicle, a chassis supporting axles on which the wheels are mounted, the steering control configured to generate a steering command configured to control the wheels when the steering control is activated based on the proximity of the identified closest in path vehicle, and a brake actuator configured to actuate brakes for one or more of the wheels, and a braking control configured to generate a braking command to control the brake actuator based on activation of the lane departure warning indicator.

In some embodiments, the vehicle is an electric vehicle.

In another aspect a method comprises capturing at least one image of a traffic lane in front of a vehicle using at least one camera, detecting motion characteristics of the vehicle using an inertial measurement unit (IMU), obtaining a vehicle motion trajectory using the IMU and based on one or more vehicle path prediction parameters, obtaining a vehicle vision trajectory based on the at least one image, wherein the vehicle vision trajectory includes at least one lane boundary for a segment of the traffic lane occupied by the vehicle, determining distances between one or more points on the vehicle and one or more intersection points of the at least one lane boundary based on the obtained vehicle motion trajectory, determining at least one time to line crossing (TTLC) based on the determined distances and a speed of the vehicle, and activating a lane departure warning indicator based on the determined at least one TTLC.

In some embodiments, obtaining the vehicle motion trajectory includes determining first parameters for predicting a path of the vehicle, determining second parameters for predicting the path of the vehicle, and predicting the path of the vehicle using a combination of the first parameters and the second parameters, wherein the combination is weighted based on the speed of the vehicle.

In some embodiments, the first parameters comprise a first path curvature for predicting the path of the vehicle and a first rate of the first path curvature and the second parameters comprise a second path curvature for predicting the path of the vehicle and a second rate of the second path curvature.

In some embodiments, the weighted combination weights the first parameters using a weight $\alpha$ and weights the second parameters using a weight $1-\alpha$.

In some embodiments, the weight $\alpha$ is applied to the first parameters for vehicle speeds below a first threshold, and the weight $1-\alpha$ is applied to the second parameters for vehicle speeds above a second threshold.

In some embodiments, the first parameters comprise a first path curvature $\kappa_L$ and a first rate $\kappa'_L$, the second parameters comprise a second path curvature $\kappa_H$ and a second rate $\kappa'_H$, the first path curvature $\kappa_L$ and the second path curvature $\kappa_H$ are combined according to $\kappa=\alpha \cdot \kappa_L+(1-\alpha) \cdot \kappa_H$, and the first rate $\kappa'_L$ and the second rate $\kappa'_H$ are combined according to $\kappa'=\alpha \cdot \kappa'_L+(1-\alpha) \cdot \kappa'_H$.

In some embodiments, determining the at least one TTLC includes determining a plurality of TTLCs each based on a distance between one of the one or more points on the vehicle and one of the one or more intersection points of the at least one lane boundary and activating the lane departure warning indicator includes comparing a threshold with a combination of the plurality of TTLCs with applied weighting factors.

In some embodiments, the one or more points on the vehicle include a left corner point, a center point, and a right corner point.

In some embodiments, the method further comprises driving wheels of the vehicle with a motor, generating a steering command control the wheels based on activation of the lane departure warning indicator, and generating a braking command to control the brake actuator based on activation of the lane departure warning indicator.

In some embodiments, the vehicle is an electric vehicle.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 5 and 5A-5B illustrate processing for a vehicle within which vehicle lane departure detection and lane departure warning are implemented in accordance with embodiments of the present disclosure;

DETAILED DESCRIPTION

FIGS. 1 through 9, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

ADAS features often include lateral warning features that alarm a driver, such as a lane departure warning (LDW) that warns the driver when the vehicle begins to drift to the boundary of the lane. Existing LDW features, however, are limited in operation range because the LDW is only activated when a perception of the lane is available on roads with low curvature. Existing LDW features also only cover road segments with limited curvature, using limited vision information. In such systems, parameters such as distance to lane boundary, rate of departure, and time to line crossing (TTLC) can be calculated using vision information, without—or at least with very little—prediction information of ego vehicle motion. Additionally, the vehicle's LDW feature is often turned off by the driver because of the warning's disturbing and frequent alarm due to inaccurate lane departure determination.

The present disclosure provides a vehicle with improved lane departure detection and warning system. The improved lane detection and warning system combines both ego motion of the vehicle and vehicle vision to accurately determine TTLC and predict lane departure by predicting vehicle trajectory from both ego motion prediction and camera lane detection using parameters including lateral offset, heading offset, path curvature, and rate of curvature, and without requiring additional calculations of distance to lane boundary and rate of departure. The improved vehicle of the present disclosure using accurately determined TTLC provides the driver with more precise and un-disturbing warnings.

With kinematics, the curvature of the vehicle's predicted path (e.g., occupied traffic lane) can be obtained, together with the vehicle's lateral acceleration and speed. For example, lateral vehicle acceleration $A_y$ (in units of meters per second squared, [m/s²]), path curvature κ (in units of [m⁻¹]), and vehicle speed $V_x$ (in units of [m/s]) are related as:

$$A_y = \kappa \cdot V_x,$$
$$\kappa = \frac{A_y}{V_x}.$$

However, the information needs to be filtered for noisy lateral acceleration and does not consider the vehicle's dynamic effects.

Ackerman steer angle calculates path curvature from the road wheel angle $\delta_{rwa}$ (in units of radians [rad]) and the wheelbase length L (in units of [m]) as follows:

$$\tan(\delta_{rwa}) = \kappa \cdot L,$$
$$\kappa = \frac{\tan(\delta_{rwa})}{L}.$$

However, the relationship is not considered accurate for low-speed maneuvers.

Figure 1:
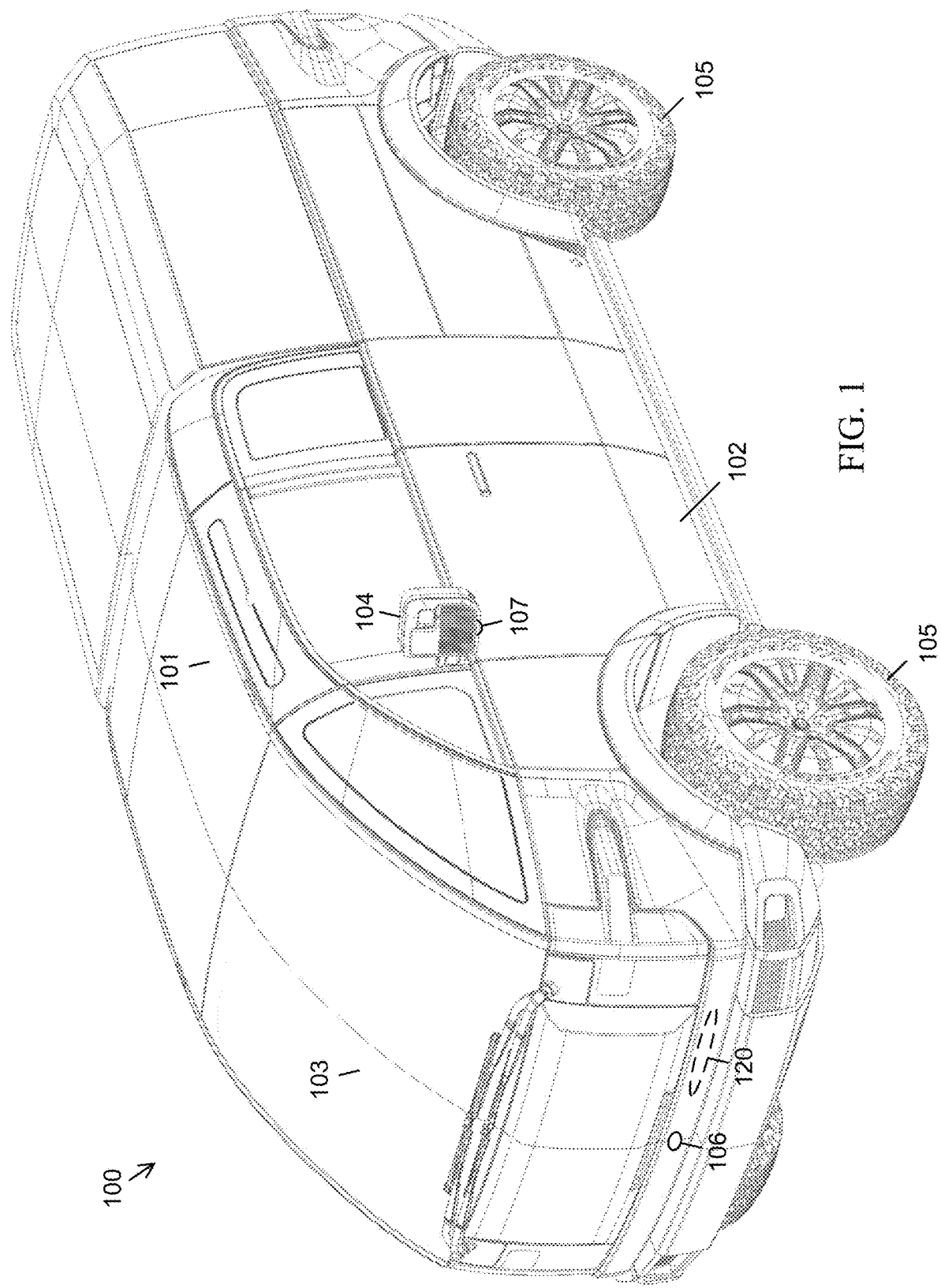
FIG. 1 is a perspective view of a vehicle within which improved vehicle lane departure detection and lane departure warning are implemented in accordance with embodiments of the present disclosure.

FIG. 1 is a perspective view of a vehicle 100 within which improved vehicle lane departure detection and lane departure warning are implemented in accordance with embodiments of the present disclosure. The embodiment of the vehicle 100 illustrated in FIG. 1 is for illustration and explanation only. FIG. 1 does not limit the scope of this disclosure to any particular implementation of a vehicle.

The vehicle 100 of FIG. 1 includes a chassis (not visible in FIG. 1) supporting a cabin 101 for carrying passengers. In some embodiments, the vehicle 100 is an EV in which the chassis is in the form of a "skateboard" vehicle platform supporting one or more energy storage elements (e.g., batteries) that provide input electrical power used by various components of the EV, such as one or more electric motors of the vehicle 100 and a control system of the electric vehicle described in further detail below. In other embodiments, the vehicle 100 is a combustion engine vehicle.

Passengers may enter and exit the cabin 101 through at least one door 102 forming part of the cabin 101. A transparent windshield 103 and other transparent panels mounted within and forming part of the cabin 101 allow at least one passenger (referred to as the "operator," even when the vehicle 100 is operating in an AD mode) to see outside the cabin 101. Rear view mirrors 104 mounted to sides of the cabin 101 enable the operator to see objects to the sides and rear of the cabin 101 and may include warning indicators (e.g., selectively illuminated warning lights) for ADAS features such as blind spot warning (indicating that another vehicle is in the operator's blind spot) and/or lane departure warning.

Wheels 105 mounted on axles that are supported by the chassis and driven by the motor(s) (all not visible in FIG. 1) allow the vehicle 100 to move smoothly. The wheels 105 are mounted on the axles in a manner permitting rotation relative to a longitudinal centerline of the vehicle 100 for steering and are also connected to steering controls (not visible). Conventional automobile features such as headlamps, taillights, turn signal indicators, windshield wipers, and bumpers are also depicted. The vehicle 100 may further include cargo storage within or connected to the cabin 101 and mounted on the chassis, with the cargo storage area(s) optionally partitioned by dividers from the passenger area(s) of the cabin 101.

In the present disclosure, the vehicle 100 includes a vision system including at least a front camera 106, side cameras 107 (mounted on the bottoms of the rear view mirrors 104 in the example depicted), and a rear camera. The cameras 106, 107 provide images to the vehicle control system for use as part of ADAS and AD features as described below, and the images may optionally be displayed to the operator. In addition, the vehicle 100 includes an inertial measurement unit (IMU) 120 (shown in phantom in FIG. 1, as the IMU 120 is not visible from the exterior of vehicle 100).

Although FIG. 1 illustrates one example of a vehicle 100, those skilled in the art will recognize that the full structure and operation of a suitable vehicle are not depicted in the drawings or described here. Instead, for simplicity and clarity, only the structure and operation necessary for an understanding the present disclosure is depicted and described. Various changes may be made to the example of FIG. 1, and the improved vehicle path prediction and closest in path vehicle detection described in this disclosure may be used with any other suitable vehicle.

Figures 2, 2A:
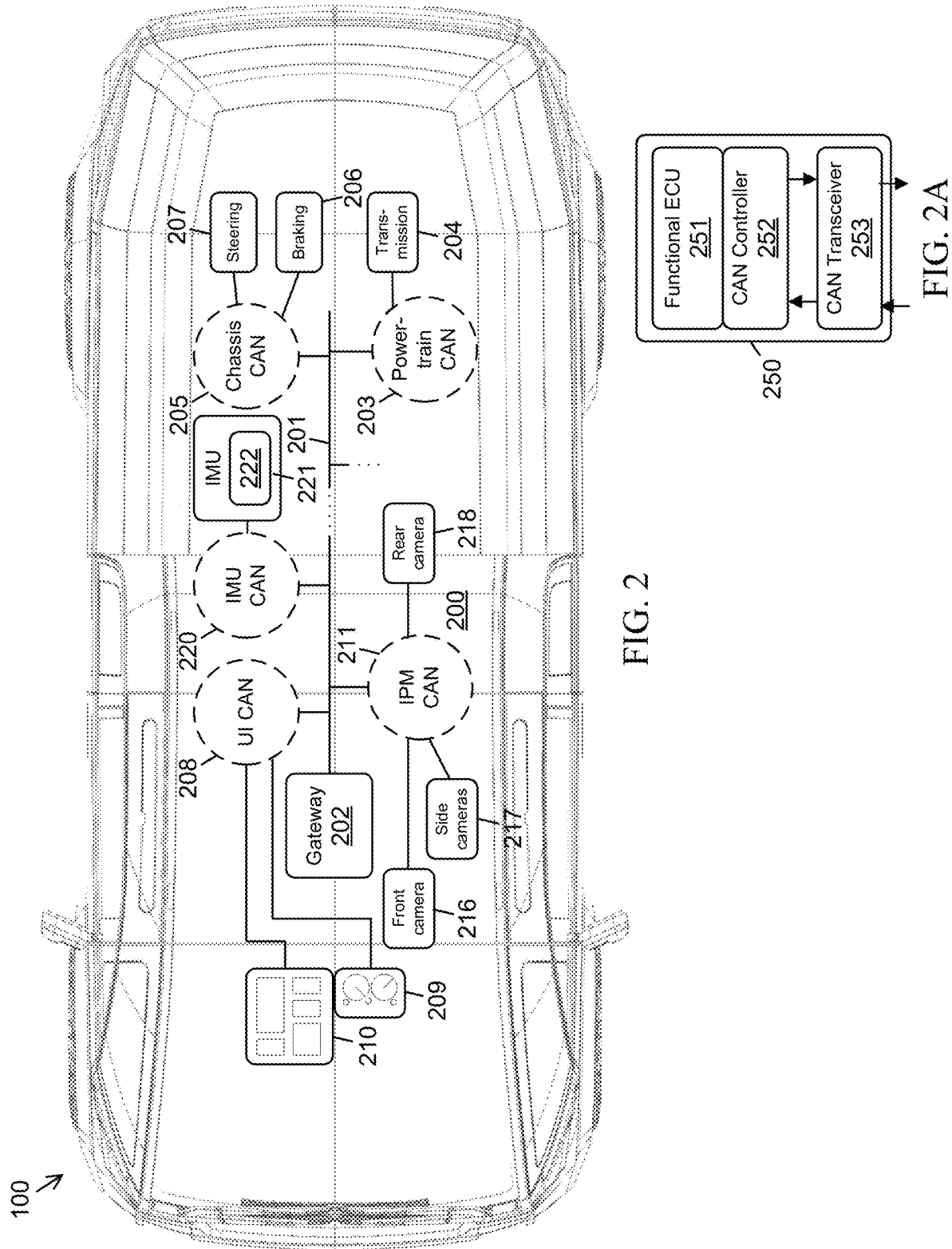
FIGS. 2 and 2A depict a vehicle control system for a vehicle within which improved vehicle lane departure detection and lane departure warning are implemented in accordance with embodiments of the present disclosure.

FIGS. 2 and 2A depict a vehicle control system 200 for a vehicle within which improved vehicle lane departure detection and lane departure warning are implemented in accordance with embodiments of the present disclosure. The embodiment of the vehicle control system 200 illustrated in FIGS. 2 and 2A is for illustration and explanation only. FIGS. 2 and 2A do not limit the scope of this disclosure to any particular implementation of a vehicle control system.

FIG. 2 depicts a modern vehicle control system 200 utilizing various electronic control units (ECUs) interconnected on a controller area network (CAN) via the so-called CAN bus. The standard for the CAN bus was released around 1993 by the International Organization for Standardization (ISO) as ISO 11898. The current version of that standard is ISO 11898-1:2015, and the CAN busses described herein may comply with that standard in some embodiments. Each ECU typically includes a printed circuit board (PCB) with a processor or microcontroller integrated circuit coupled to various input sensors, switches, relays, and other output devices. The CAN design permits the ECUs to communicate with each other without the need for a centralized host. Instead, communication takes place on a peer-to-peer basis. The CAN design therefore permits data from sensors and other ECUs to circulate around the vehicle ECUs, with each ECU transmitting sensor and programming information on the CAN bus while simultaneously listening to the CAN bus to pull out data needed to complete tasks being performed by that ECU. There is no central hub or routing system, just a continuous flow of information available to all the ECUs.

By way of example, power doors on a vehicle may be operated by an ECU called the body control module (not shown in FIG. 2). Sensors constantly report whether doors are open or closed. When the driver pushes a button to close a door, the signal from that switch is broadcast across the CAN bus. When the body control module ECU detects that signal, however, the body control module ECU does not simply close the door. Instead, the body control module ECU first checks the data stream to make sure the vehicle is in park and not moving and, if all is well, gives a command to a power circuit that energizes the motors used to close the door. The body control module ECU may go even further, such as by monitoring the voltage consumed by the motors. If the body control module ECU detects a voltage spike, which happens when a door is hindered by an errant handbag or a wayward body part, the ECU immediately reverses the direction of the door to prevent potential injury. If the door closes properly, the latch electrically locks the door shut, which is an event that may be detected by the body control module ECU.

Notably, vehicle control systems are migrating to higher-speed networks with an Ethernet-like bus for which each ECU is assigned an Internet protocol (IP) address. Among other things, this may allow both centralized vehicle ECUs and remote computers to pass around huge amounts of information and participate in the Internet of Things (IoT).

In the example shown in FIG. 2, the vehicle control system 200 includes a CAN bus 201 embodied or controlled by a gateway ECU 202, which facilitates messages on and among CANs, transmitted and detected by ECUs. FIG. 2 illustrates a powertrain CAN 203 to which a transmission ECU 204 is connected and a chassis CAN 205 to which a braking ECU 206 and a steering (e.g., steering angle) ECU 207 are connected. The braking ECU 206 is connected to brake actuator(s) (not shown) for emergency and normal braking, while the steering ECU 207 is connected to a steering drive motor for evasive and normal steering. The vehicle control system 200 in FIG. 2 also includes a user interface (UI) CAN 208 to which a "dashboard" ECU 209 and a touchscreen ECU 210 are connected. The ECUs 209 and 201 may be integrated with the respective dashboard controls and touchscreen. The UI CAN 208 and the associated dashboard ECU 209 and touchscreen 210 allow the operator to set operating parameters such as following distance for ACC, enable or disable ADAS indicators such as blind spot detection or collision warning, and the like. The dashboard ECU 209 may be connected to sensors and indicators other than those on the dashboard, such as the rear view mirror blind spot indicators described above. The ADAS indicators may include illuminated indicators on any combination of the dashboard and the rear view mirrors and/or in a heads-up display projected onto the windshield 103; audio warnings sounded on the vehicle's audio system speakers; and/or haptic indicators such as a vibrator within the vehicle operator's seat.

For the present disclosure, the vehicle control system 200 includes an image processing module (IPM) CAN 211 to which the front camera ECU 216, side camera ECU 217, and rear camera ECU 218 are connected. The front camera ECU 216 receives image data from the front camera 106 on the vehicle 100, while the side camera ECU 217 receives image data from each of the side cameras 107, and the rear camera ECU 218 receives image data from the rear camera. In some embodiments, a separate ECU may be used for each camera, such that two side camera ECUs may be employed. The IPM CAN 211 and the front camera ECU 216, side camera ECU 217, and rear camera ECU 218 process image data for use in vision-based ADAS features, such as providing a rear back-up camera display and/or stitching together the images to create a "bird's eye" view of the vehicle's surroundings.

For the present disclosure, the vehicle control system 200 also includes an IMU CAN 220 to which an IMU ECU 221 having an IMU 222 is connected. The IMU CAN 220, IMU ECU 221, and IMU 222 are used to detect vehicle motion such as yaw, pitch, and roll of the vehicle 100.

FIG. 2A illustrates a high level block diagram for the architecture 250 of each CAN depicted in FIG. 2. Each CAN shown in FIG. 2, including the chassis CAN 205, IPM CAN 211, and IMU CAN 220, includes a functional ECU 251 for the specific function performed by the respective CAN (e.g., at least steering and braking in the case of the chassis CAN 205, image processing in the case of the IPM CAN 211, and vehicle motion detection in the case of the IMU CAN 220). The functional ECU 251 is coupled to a CAN controller 252 that controls the interactions of the respective CAN with the other CANs within the vehicle 100 through the gateway ECU 202. A CAN transceiver 253 receives messages from and transmit messages to other CANs under the control of the CAN controller 252.

Although FIGS. 2 and 2A illustrate one example of a vehicle control system 200, those skilled in the art will recognize that the full structure and operation of a suitable vehicle control system is not depicted in the drawings or described here. Instead, for simplicity and clarity, only the structure and operation necessary for an understanding of the present disclosure is depicted and described. Various changes may be made to the example of FIGS. 2 and 2A, and the improved vehicle path prediction and closest in path vehicle detection described in this disclosure may be used with any other suitable vehicle control system.

To support various ADAS functions such as collision avoidance during high performance operation, the IPM CAN 211 for the vehicle 100 can accurately predict the vehicle path, and the IMU CAN 220 can detect vehicle motion. In the present disclosure, a combination of vehicle motion and vision (with optional input from other sensors) is used to predict lane boundary locations within the ego vehicle path (where "ego" refers to the vehicle implementing the ADAS and/or AD feature(s)).

Figure 3:
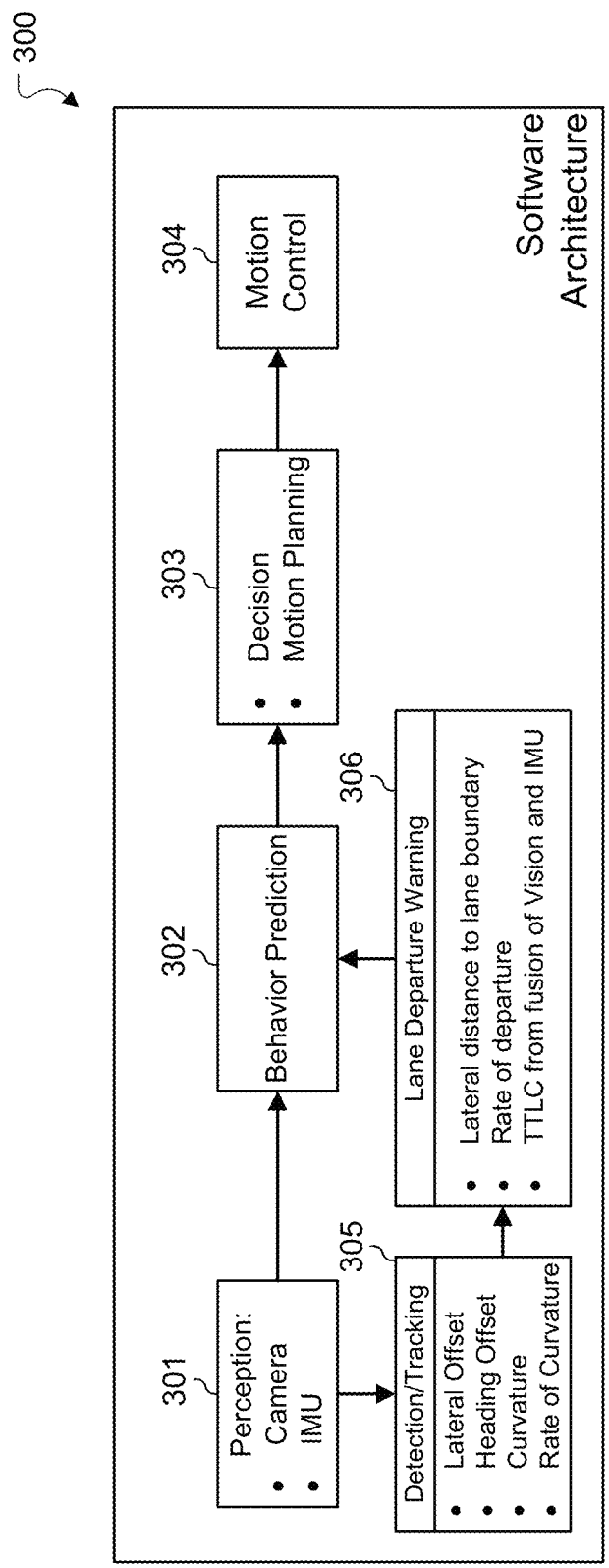
FIG. 3 illustrates a functional diagram of a system within a vehicle for performing improved vehicle lane departure detection and lane departure warning in accordance with embodiments of the present disclosure.

FIG. 3 illustrates a functional diagram of a system 300 within a vehicle for performing improved vehicle lane departure detection and lane departure warning in accordance with embodiments of the present disclosure. The embodiment of the system 300 illustrated in FIG. 3 is for illustration and explanation only. FIG. 3 does not limit the scope of this disclosure to any particular implementation. In some embodiments, the system 300 in FIG. 3 may be implemented by, or in connection with, the chassis CAN 205 and braking ECU 206 and steering ECU 207 in FIG. 2, including the functional (CAN) ECU 251, CAN processor/controller 252, and CAN transceiver 253 depicted in FIG. 2A for the chassis CAN 205. Lane detection for the system 300 in FIG. 3 may be implemented using, or by connection to, the front camera 106 and the side cameras 107 in FIG. 1 and the IPM CAN 211, front camera ECU 216, side camera ECU(s) 217, and rear camera ECU 218 in FIG. 2, including the functional (CAN) ECU 251, CAN processor/controller 252, and CAN transceiver 253 depicted in FIG. 2A for the IPM CAN 211, as well as by using, or by connection to, the IMU CAN 220, the IMU ECU 221 and the IMU 222 depicted in FIG. 2, including the functional (CAN) ECU 251, CAN processor/controller 252, and CAN transceiver 253 depicted in FIG. 2A for the IMU CAN 220. Specific functions depicted in FIG. 3 may be distributed among those components.

To support ADAS and AD features, the system 300 includes the functions of camera perception and IMU vehicle motion 301, behavior prediction 302, decision and motion planning 303, and motion control 304. In various embodiments, at least the behavior prediction 302, the decision and motion planning 303, and the motion control 304 is performed by one or more processors, such as the CAN processor/controller 252. Camera perception and IMU vehicle motion 301 can detect a traffic lane ahead, the relative position of the traffic lane boundaries and the vehicle within the boundaries, the relative position and velocity of other vehicles, and the motion of the vehicle. The vehicle behavior prediction 302 determines whether the ego vehicle could potentially cross the lane boundary, risking collision, based on the ego vehicle's speed and detected motion, the predicted path, and the relative of the lane boundaries. Decision and motion planning 303 and motion control 304 respectively determine and, if necessary, issue one or more lane departure warnings or indicators, such as an audio, visual, or haptic feedback warning or other responses such as steering assistance and/or emergency braking.

The camera perception and IMU vehicle motion 301 are used to perform detection and tracking 305 to determine parameters for lane departure detection such as lateral offset, heading offset, path curvature of a predicted path, and rate of curvature of the predicted path. In the various embodiments of this disclosure, camera vision of the vehicle provides separate lateral offset, heading offset, curvature, and rate of curvature based on the camera vision, while the IMU provides separate lateral offset, heading offset, curvature, and rate of curvature based on ego vehicle motion. The ego vehicle motion can include ego vehicle speed, yaw rate, lateral offset from a reference path, longitudinal acceleration, and steering angle. In some embodiments, in addition to the IMU, various ego vehicle parameters may also be determined from vision, radar, other sensors, or some combination thereof.

Based on the parameters and ego vehicle motion determined from the detection and tracking 305, the behavior prediction 302 performs lane departure warning 306, such as by determining a lateral distance to the lane boundary, a rate of departure, and/or TTLC by fusing or combining predicted trajectories from the detected vision and ego vehicle motion. In various embodiments of the present disclosure, the behavior prediction 302 uses the TTLC determined from the predicted vision and vehicle motion trajectories to predict a lane boundary crossing and issue in response to the prediction a lane departure warning to the driver.

Figure 4:
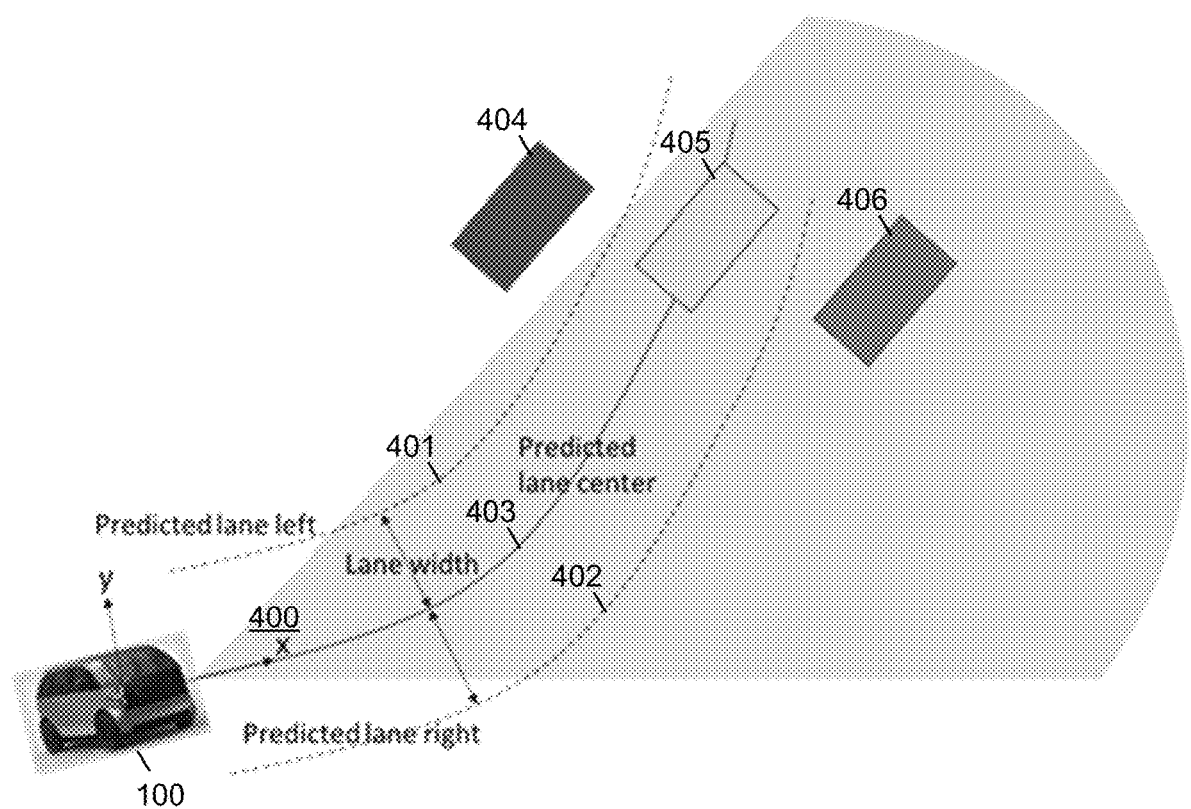
FIG. 4 illustrates a scenario for ego vehicle path prediction and lane boundary detection in accordance with embodiments of the present disclosure.

FIG. 4 illustrates a scenario for ego vehicle path prediction and lane boundary detection in accordance with embodiments of the present disclosure. The ego vehicle 100 occupies and travels within a traffic lane 400 that includes left and right lane boundaries 401, 402 and a predicted lane centerline 403. The predicted lane centerline 403 may serve as a reference path for ego vehicle path prediction. A polynomial representing the path prediction for the ego vehicle 100 can be expressed as:

$$y_m = a_0 + a_1 x + a_2 x^2 + a_3 x^3$$

where x is distance along the longitudinal direction of the ego vehicle, y is distance along the lateral direction, $a_0$ is the ego vehicle lateral offset from the reference path, $a_1$ is the ego vehicle heading offset from the reference path, $a_2$ is curvature of the predicted (and reference) path to be found, and $a_3$ is the rate of curvature to be found. When the ego vehicle 100 travels along the reference path (the lane centerline), the above polynomial (with $a_0=0$) represents the predicted lane centerline 403 shown in FIG. 4. The polynomials corresponding to the left and right lane boundaries 401, 402 can be written with the same coefficients ($a_1, a_2, a_3$) but with lateral offsets ($a_0$) that are half of the lane width, meaning $$a_0 = \pm \frac{1}{2} \cdot \text{Lane width.}$$

The path prediction represented by the above polynomial is used in predicting lane departure of the ego vehicle, such as predicting whether the ego vehicle is or will soon be passing over the left lane boundary 401 or the right lane boundary 402. In some embodiments, the path prediction represented by the above polynomial can also be used to identify the closest in path vehicle as target vehicle 405 from among target vehicles 404, 405 and 406.

FIGS. 5 and 5A-5B illustrate processing for a vehicle within which vehicle lane departure detection and lane departure warning are implemented in accordance with embodiments of the present disclosure. The embodiment of the processing 500 illustrated in FIG. 5 is for illustration and explanation only. FIG. 5 does not limit the scope of this disclosure to any particular implementation.

Vehicle kinematics 501, vehicle dynamics 502, and weighting 503 may be implemented as part of behavior prediction 302 and/or decision and motion planning 303. Vehicle kinematics 501 receive as inputs 504 the ego vehicle steering angle, speed, and yaw rate. Vehicle dynamics 502 receive as inputs 505 the ego vehicle steering angle and speed. Weighting 503 receives as an input 506 the ego vehicle speed.

In some embodiments, the ego vehicle path prediction is made with a third-order polynomial including both curvature and rate of curvature. Two types of curvature and rate of curvature may be obtained by using the Ackerman angle, kinematics, and vehicle dynamics. The final curvature and rate of curvature may be determined by fusing the previous initial two types of curvature and the associated rates based on the vehicle speed.

The path curvature $\kappa_L$ can be expressed from the Ackerman angle as:

$$\kappa_L = \frac{\tan(\delta_{rwa})}{L}.$$

The rate of that path curvature $\kappa'_L$ can be derived as:

$$\frac{d}{dx}(\kappa_L) = \kappa'_L = \frac{d}{dt}(\kappa_L) \cdot \frac{dt}{dx} = sec^2(\delta_{rwa}) \cdot \frac{\dot{\delta}_{rwa}}{L} \cdot \frac{1}{V_x}$$

where the derivative of road wheel angle $\dot{\delta}_{rwa}$ can be obtained from the first-order delay between road wheel angle ($\delta_{rwa}$) and steering wheel angle ($\delta_{swa}$) by a time delay $\tau$ and a ratio ($\kappa$):

$$\frac{\delta_{rwa}}{\delta_{swa}} = \frac{k}{\tau s + 1},$$

which can be written in the time domain as:

$$\dot{\delta}_{rwa} = \frac{1}{\tau}\delta_{rwa} + \frac{k}{\tau}\delta_{swa}.$$

The path curvature $\kappa_H$ can be also expressed from kinematics using yaw rate $\omega$ and vehicle speed $V_x$:

$$\kappa_H = \frac{\omega}{V_x}.$$

The rate of path curvature $\kappa'_H$ can be derived as:

$$\frac{d}{dx}(\kappa_H) = \kappa'_H = \frac{d}{dt}(\kappa_H) \cdot \frac{dt}{dx} = \dot{\kappa}_H \cdot \frac{dt}{dx} = \left(\frac{\dot\omega}{V_x} - \frac{\omega a_x}{V_x^2}\right) \cdot \frac{1}{V_x},$$

where $\dot\omega$ can be obtained from bicycle dynamics. The integrated system model with first-order delay and bicycle dynamics can be expressed as:

$$\begin{Bmatrix} \dot\beta \\ \dot\omega \\ \dot\delta_{rwa} \end{Bmatrix} = \begin{bmatrix} \frac{-2}{mV_x}(C_f+C_r) & -1+\frac{2(-l_fC_f+l_rC_r)}{mV_x^2} & 2\frac{C_f}{mV_x} \\ \frac{2}{I_z}(-l_fC_f+l_rC_r) & \frac{-2}{I_zV_x}(l_f^2C_f+l_r^2C_r) & 2\frac{l_fC_f}{I_z} \\ 0 & 0 & -\frac{1}{\tau} \end{bmatrix} \begin{Bmatrix} \beta \\ \omega \\ \delta_{rwa} \end{Bmatrix} + \begin{bmatrix} 0 \\ 0 \\ \frac{k}{\tau} \end{bmatrix}\delta_{swa},$$

where $\beta$ is side slip angle, $\omega$ is yaw rate, $C_f$ and $C_r$ are respectively front/rear cornering stiffness, $l_f$ and $l_r$ are respectively front/rear axle distance from the vehicle center of gravity, m is vehicle mass, and $I_z$ is yaw rotational inertia.

Accordingly, vehicle kinematics 501 output two curvatures 507, $\kappa_L$ and $\kappa_H$. Vehicle dynamics 502 employ those two curvatures to derive two rates of curvature 508, $\dot\kappa_L$ and $\dot\kappa_H$ (or alternatively $\kappa'_L$ and $\kappa'_H$). The relationship among vehicle speed $I_z$, steering wheel angle $\delta_{swa}$, and road wheel angle $\delta_{rwa}$ may be provided in a mapping table 509 as illustrated in FIG. 5A.

The final curvature used for ego vehicle path prediction can be determined from those calculated from Ackerman angle and kinematics, and the final rate of curvature used for ego vehicle path prediction can be derived from the curvatures calculated from Ackerman angle and kinematics. For example, this may be accomplished by applying weights $\alpha$ and $1-\alpha$ as follows:

$y = \kappa x^2 + \kappa' x^3$ $\kappa = \alpha \cdot \kappa_L + (1-\alpha) \cdot \kappa_H$ $\kappa' = \alpha \cdot \kappa'_L + (1-\alpha) \cdot \kappa'_H$ The weights $\alpha$ and $1-\alpha$ can be applied by weighting 503 based on vehicle speed according to tuning parameters $v_{fading,start}$ and $v_{fading,width}$ as shown in FIG. 5B, where $\alpha$ decreases linearly and $1-\alpha$ increases linearly between $v_{fading,start}$ and $v_{fading,start}+v_{fading,width}$.

The third-order polynomial above for ego vehicle path prediction can be completed with the following coefficients:

$a_0=0$ $a_1=0$ $a_2=\kappa$ $a_3=\kappa'$

Note that $a_0=0$ and $a_1=0$ when the ego vehicle follows the reference path (the predicted lane centerline 403). The left and right lane boundaries 401, 402 have the same coefficients ($a_1$, $a_2$, $a_3$) but different lateral offsets $$a_0 = +\frac{1}{2} \cdot \text{Lane width and } a_0 = -\frac{1}{2} \cdot \text{Lane width.}$$

In various embodiments, the above ego vehicle motion trajectory prediction is determined using, or by connection to, the IMU CAN 220 and the IMU ECU 221 and the CAN processor/controller 252 depicted in FIG. 2.

Figure 6:
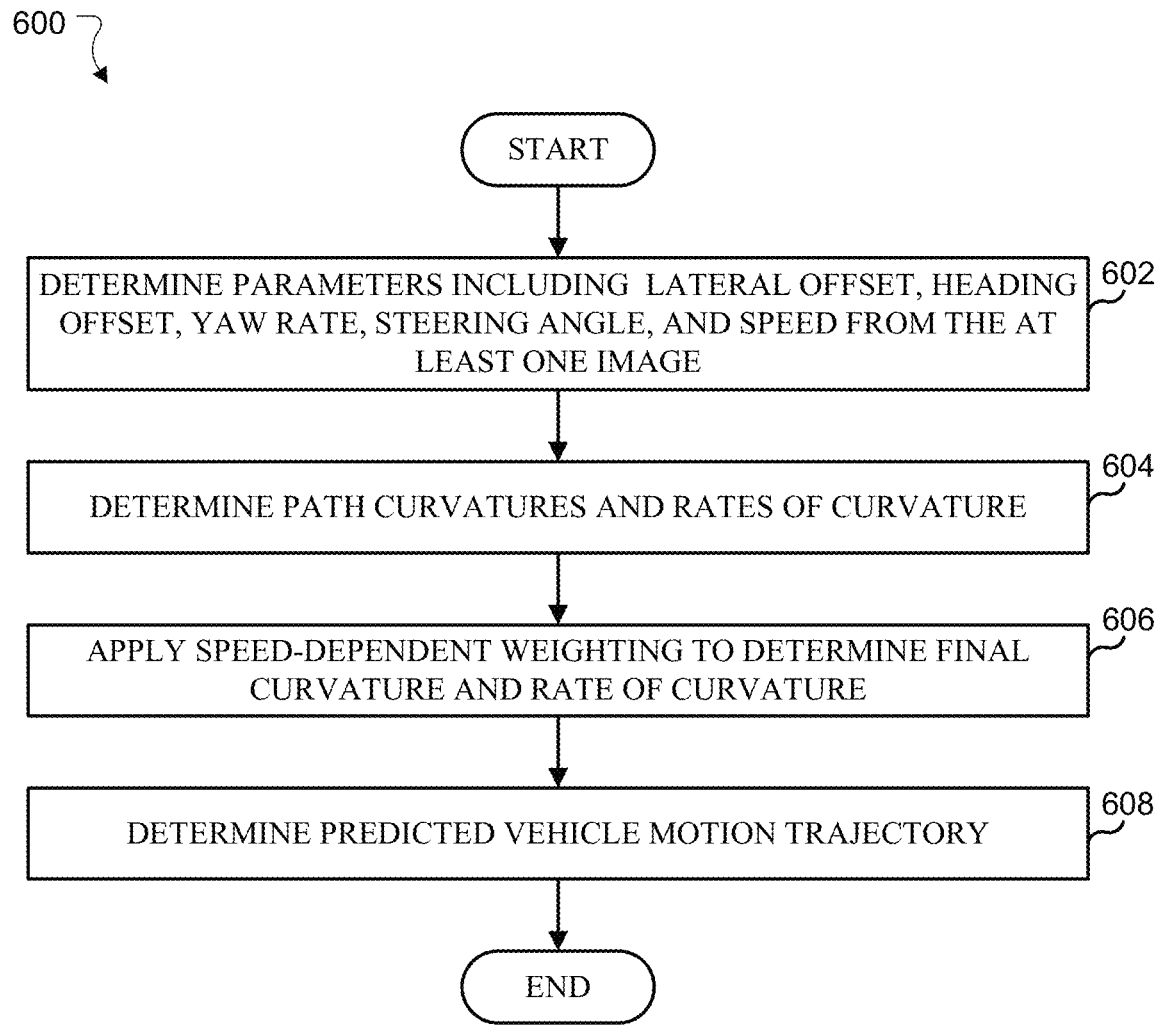
FIG. 6 illustrates an example vehicle ego motion trajectory prediction process in accordance with embodiments of the present disclosure.

FIG. 6 illustrates an example vehicle ego motion trajectory prediction process 600 in accordance with embodiments of the present disclosure. The embodiment of the process 600 illustrated in FIG. 6 is for illustration and explanation only. FIG. 6 does not limit the scope of this disclosure to any particular implementation. In some embodiments, the process 600 in FIG. 6 may be implemented using, or by connection to, the IMU CAN 220 and the IMU ECU 221 in FIG. 2; and the chassis CAN 205, braking ECU 206, and steering ECU 207 in FIG. 2. The process 600 can be performed by at least one processor such as the CAN processor/controller 252 in FIG. 2 communicatively coupled with the IMU and/or other sensors. The process 600 may also be implemented using the functions depicted in FIG. 3 and the processing depicted in FIG. 5.

The example process 600 illustrated in FIG. 6 includes, at step 602, determining parameters including the vehicle lateral offset from a reference path for the lane (which may be a lane centerline, one of the lane boundaries, or a different reference path selected based on road conditions), the vehicle heading offset, the vehicle yaw rate, a vehicle steering angle, and the vehicle speed using any suitable techniques from the IMU and/or other sensor data.

At step 604, the processor uses a kinematics control (e.g., kinematics 501) to determine path curvatures according to kinematics and Ackerman steering angle, and a dynamics control (e.g., dynamics 502) to determine rates of the two curvatures. At step 606, the processor applies vehicle speed-dependent weighting (e.g., by weighting 503) to determine a final predicted path curvature and rate of curvature. At step 608, the processor predicts the ego vehicle motion path or trajectory using at least the lateral offset, heading offset, path curvature and rate of curvature.

The determination of two curvatures based on kinematics and Ackerman steering angle, and two rates of curvature, with weighted combinations of both are used for vehicle motion path prediction to assist with detecting lane departure and issuing an LDW.

Figure 7:
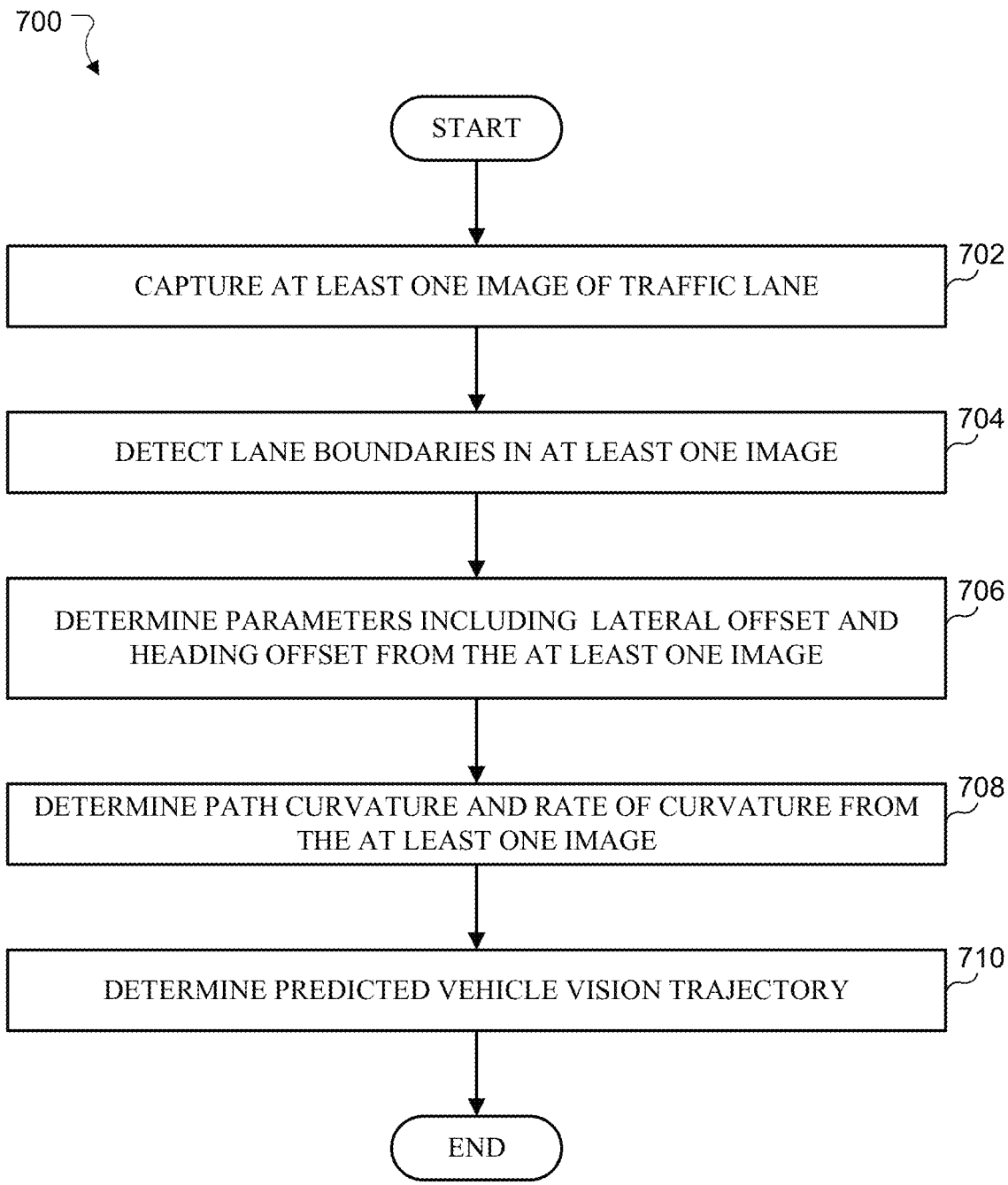
FIG. 7 illustrates an example vehicle vision trajectory prediction process in accordance with embodiments of the present disclosure.

FIG. 7 illustrates an example vehicle vision trajectory prediction process 700 in accordance with embodiments of the present disclosure. The embodiment of the process 700 illustrated in FIG. 7 is for illustration and explanation only. FIG. 7 does not limit the scope of this disclosure to any particular implementation. In some embodiments, the process 700 in FIG. 7 may be implemented using, or by connection to, the front camera 106 and the side cameras 107 in FIG. 1; and the IPM CAN 211, front camera ECU 216, side camera ECU 217 in FIG. 2. The process 700 can be performed by at least one processor such as the CAN processor/controller 252 in FIG. 2 communicatively coupled with the vehicle cameras and/or other sensors. The process 700 may also be implemented using the functions depicted in FIG. 3.

In various embodiments of this disclosure, vehicle trajectory is also predicted from vehicle vision using, or by connection to, the front camera 106 and the side cameras 107 in FIG. 1 and the IPM CAN 211, front camera ECU 216, side camera ECU(s) 217, and rear camera ECU 218, and the CAN processor/controller 252 depicted in FIG. 2. In a similar manner as the ego vehicle motion trajectory prediction, vehicle vision trajectory position can be expressed as:

$$y_v = b_0 + b_1 x + b_2 x^2 + b_3 x^3$$

where $b_i$ for i=0, . . . , 3 represent lateral/heading offset, ½ times the curvature, and ⅙ times the rate of curvature from vision, respectively.

In the example process 700 illustrated in FIG. 7, at step 702, at least one image of the traffic lane occupied by the vehicle using at least one camera mounted on the vehicle. At step 704, the processor detects lane boundaries around the vehicle from the at least one image. At step 706, the processor determines parameters from the at least one image including the lateral offset from a reference path for the lane (which may be a lane centerline, one of the lane boundaries, or a different reference path selected based on road conditions) and the vehicle heading offset using any suitable techniques from the at least one image and/or other sensor data. In some embodiments, additional parameters including vehicle kinematics such as described with respect to FIGS. 5 and 6 can also be determined. At step 708, the processor determines path curvature and rate of curvature from the at least one image. In some embodiments, to determine the lateral offset, heading offset, path curvature, and rate of curvature, pixel information in a pixel space can be transformed or converted to data such as distances to determine the vehicle location within the lane and the road curvature. In some embodiments, parameters such as curvature and rate of curvature can be calculated as described with respect to FIGS. 5, 5A, and 5B. At step 710, the processor predicts the vehicle vision path or trajectory using at least the lateral offset, heading offset, path curvature and rate of curvature.

Figure 8:
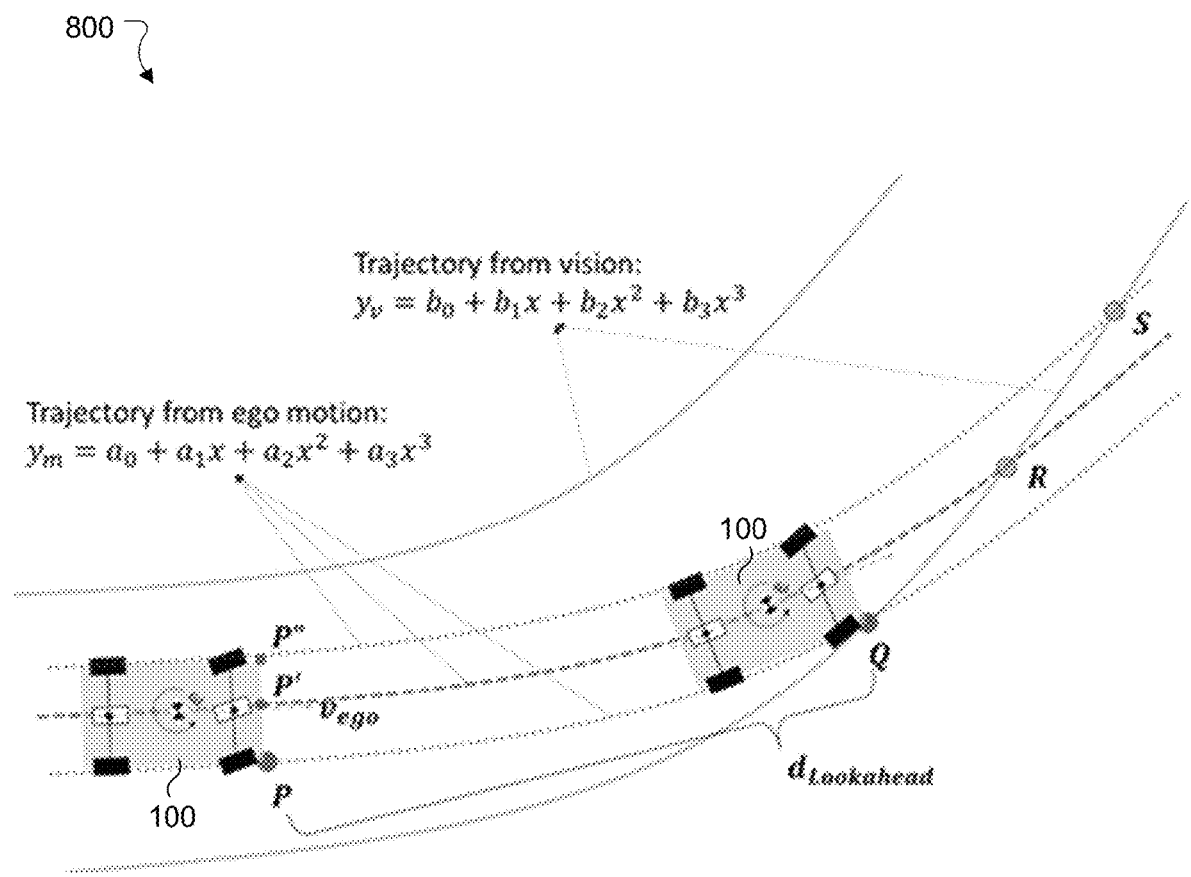
FIG. 8 illustrates an example scenario of combining ego vehicle motion trajectory prediction and vehicle vision trajectory prediction to predict lane departure and trigger LDW in accordance with embodiments of the present disclosure.

FIG. 8 illustrates an example scenario 800 of combining ego vehicle motion trajectory prediction and vehicle vision trajectory prediction to predict lane departure and trigger LDW in accordance with embodiments of the present disclosure. As described in the various embodiments of this disclosure, two polynomials representing ego vehicle motion trajectory and vehicle vision trajectory for a vehicle 100 can be expressed as:

$$y_m = a_0 + a_1 x + a_2 x^2 + a_3 x^3$$

$$y_v = b_0 + b_1 x + b_2 x^2 + b_3 x^3$$

where $y_m$ represents ego vehicle motion trajectory and $y_v$ represents vehicle vision trajectory.

As illustrated in FIG. 8, the predicted trajectories using vehicle motion and vehicle vision can differ and the various embodiments of the present disclosure use both predicted trajectories to provide improved lane departure detection. As illustrated in FIG. 8, vehicle points P, P', P'' are points at a right corner, a front center, and a left corner of the vehicle, respectively, whereas Q, R, S are predicted points on the lane polynomial from vehicle vision. Using the vehicle points P, P', P'' and the vision trajectory points, intersection points Q, R, S can be determined and defined by intersections of the vision trajectory points Q, R, S with the predicted ego motion path using the ego trajectory polynomial. For example, when P matches Q, then the right corner of vehicle touches the right lane marking. Similarly, when P'=R then the front center of vehicle is at the right lane marking, and when P''=S then the left corner of vehicle is at right lane marking. If the ego motion trajectory is parallel to the lane polynomial then there are no intersection points of Q, R, and S, meaning that ego vehicle is traveling parallel to the lane, especially in the instance of a zero or near zero curvature lane.

Figure 9:
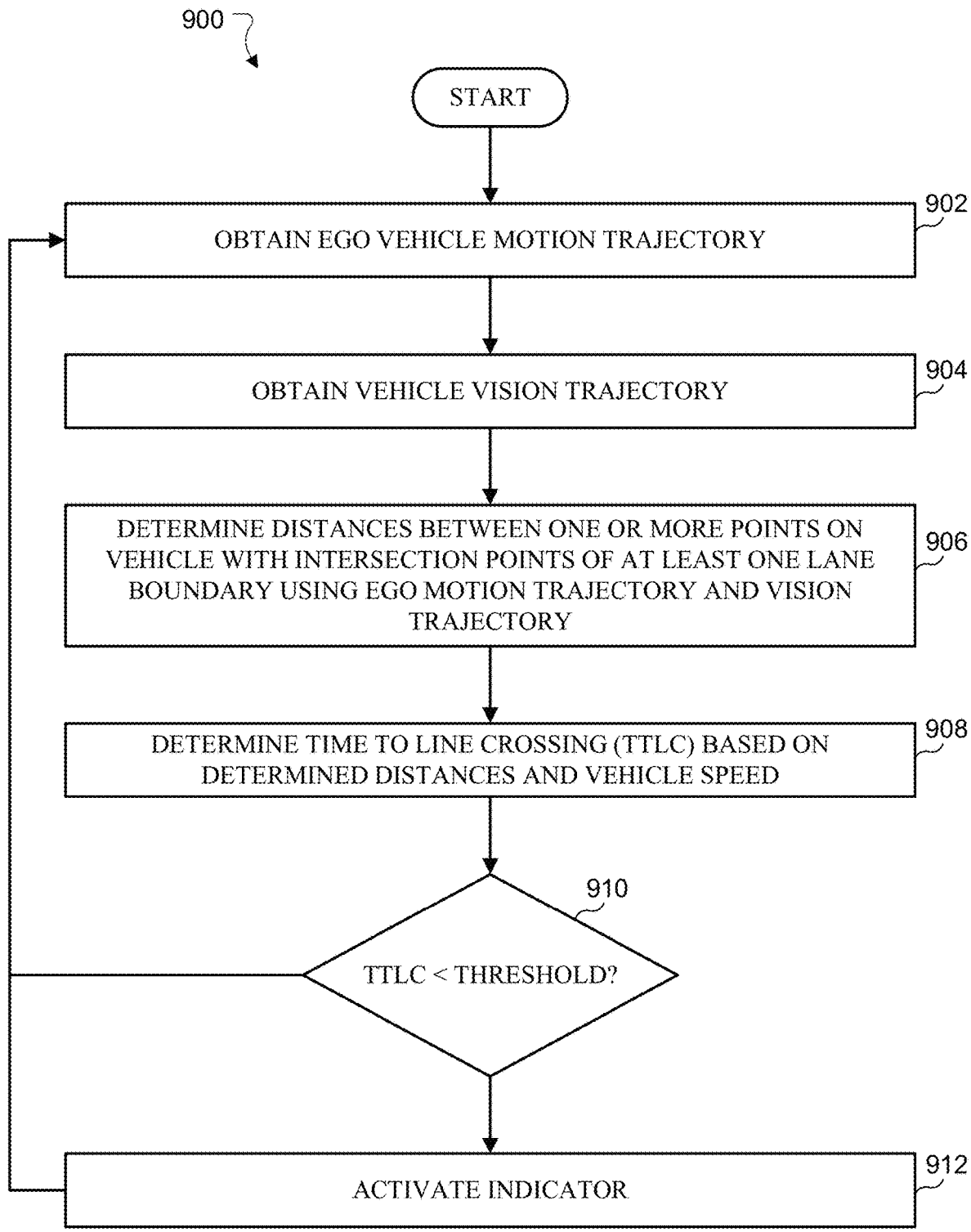
FIG. 9 illustrates an example TTLC determination and lane departure warning process in accordance with embodiments of the present disclosure.

FIG. 9 illustrates an example TTLC determination and lane departure warning process 900 in accordance with embodiments of the present disclosure. The embodiment of the process 900 illustrated in FIG. 9 is for illustration and explanation only. FIG. 9 does not limit the scope of this disclosure to any particular implementation. In some embodiments, the process 900 in FIG. 9 may be implemented using, or by connection to, the IMU CAN 220 and the IMU ECU 221 in FIG. 2; the chassis CAN 205, braking ECU 206, and steering ECU 207 in FIG. 2; the front camera 106 and the side cameras 107 in FIG. 1; and the IPM CAN 211, front camera ECU 216, side camera ECU 217 in FIG. 2. The process 900 can be performed by at least one processor such as the CAN processor/controller 252 in FIG. 2 communicatively coupled with the IMU, vehicle cameras, and/or other sensors. The process 900 may also be implemented using the functions depicted in FIG. 3.

At step 902, the processor obtains ego vehicle motion trajectory information from the IMU and/or other vehicle sensors, such as described with respect to FIGS. 4-6, and as represented by polynomial $y_m$ in the various embodiments of this disclosure. At step 904, the processor obtains vehicle vision trajectory information from the vehicle cameras and/or other sensors, such as described with respect to FIG. 7, and as represented by polynomial $y_v$ in the various embodiments of this disclosure.

At step 906, using the obtained vehicle motion trajectory and vehicle vision trajectory, the processor determines distances of one or more points on the vehicle, such as the vehicle points P, P', P'' representing points at the right corner, the front center, and the left corner of the vehicle, respectively, and one or more intersection points, such as intersection points Q, R, S of at least one lane boundary defined by the vision trajectory, as also described with respect to FIG. 8. The distances between from the vehicle points to the intersection points can be defined as:

distance between P and Q: $d_{PQ} \triangleq d_{Lookahead}$
distance between P' and Q: $d_{P'Q}$
distance between P'' and Q: $d_{P''Q}$ where all the distances above can be calculated with two polynomials along the polynomial:

$$\int_{x_s}^{x_e} \sqrt{\left(1+\left(\frac{dy}{dx}\right)^2\right)} dx,$$

where $x_s$ and $x_e$ present the starting and ending points.

At step 908, the processor determines one or more TTLCs. For example, with the distances determined at step 906, and with a detected vehicle speed $V_{ego}$, three time to line crossings (TTLC) can be calculated as:

$$TTLC_Q = d_{Lookahead}/V_{ego}$$

$$TTLC_R = d_{P'Q}/V_{ego}$$

$$TTLC_S = d_{P''Q}/V_{ego}$$

where $V_{ego} > 0$ and $TTLC_Q$ is the earliest of three TTLCs, which includes not only vision information but also the prediction information of ego vehicle motion. The TTLC determination described above does not require additional calculation of distance to lane boundary and rate of departure.

At decision step 910, the processor determines if a calculated TTLC parameter is below a threshold, where the threshold is a predetermined amount of time. For example, $TTLC_Q$ as defined above can be used with a threshold as follows:

LDW=1(on) if $TTLC_Q < TTLC_{threshold}$

As another example, the processor can combine each of the three above TTLCs can with weighting factors, such as follows:

LDW=1(on) if $w_Q \cdot TTLC_Q + w_R \cdot TTLC_R + w_S \cdot TTLC_S < TTLC_{threshold}$ where the tunable weights range $0 < w_Q, w_R, w_S < 1$, where more weight can be on $w_Q$ for an earlier warning, and more weight can be on $w_S$ for a later warning.

If, at decision step 910, the processor determines the TTLC parameter is not below the threshold, the process 900 loops back to step 902. If, at decision step 910, the processor determines the TTLC parameter is below the threshold, the process 900 moves to step 912. At step 912, the processor activates an LDW indicator such as an audible, visual or haptic warning indicator. The process 900 then loops back to step 902 to perform another iteration of the process to provide continuous lane departure detection and warning services. The warning indicators may be deactivated when a subsequent iteration of the process determines that vehicle lane departure is no longer imminent. The lane departure warning control signal may also be employed by a collision avoidance control.

The improved lane departure warning of the present disclosure helps predict and warn of the lane departure of the subject vehicle, even during high performance maneuvers. In some cases, this may allow a planning and control module to take control of at least vehicle steering and/or braking for a corrective action.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
 at least one camera configured to capture at least one image of a traffic lane in front of a vehicle;
 an inertial measurement unit (IMU) configured to detect motion characteristics of the vehicle; and
 at least one processor configured to:
  obtain a vehicle motion trajectory using the IMU and based on vehicle path prediction parameters, wherein the vehicle path prediction parameters include:
   first parameters for predicting a path of the vehicle, the first parameters comprising a first path curvature for predicting the path of the vehicle and a first rate of the first path curvature; and
   second parameters for predicting the path of the vehicle, the second parameters comprising a second path curvature for predicting the path of the vehicle and a second rate of the second path curvature,
  obtain a vehicle vision trajectory based on the at least one image, wherein the vehicle vision trajectory includes at least one lane boundary for a segment of the traffic lane occupied by the vehicle,
  determine distances between one or more points on the vehicle and one or more intersection points of the at least one lane boundary based on the obtained vehicle motion trajectory,
  determine at least one time to line crossing (TTLC) based on the determined distances and a speed of the vehicle, and
  activate a lane departure warning indicator based on the determined at least one TTLC.

2. The apparatus of claim 1, wherein, to obtain the vehicle motion trajectory, the at least one processor is further configured to:

predict the path of the vehicle using a combination of the first parameters and the second parameters, wherein the combination is weighted based on the speed of the vehicle.

3. The apparatus of claim 2, wherein the weighted combination weights the first parameters using a weight $\alpha$ and weights the second parameters using a weight $1-\alpha$.

4. The apparatus of claim 3, wherein:
the weight $\alpha$ is applied to the first parameters for vehicle speeds below a first threshold; and
the weight $1-\alpha$ is applied to the second parameters for vehicle speeds above a second threshold.

5. The apparatus of claim 4, wherein:
the first parameters comprise a first path curvature $\kappa_L$ and a first rate $\kappa'_L$;
the second parameters comprise a second path curvature $\kappa_H$ and a second rate $\kappa'_H$;
the first path curvature $\kappa_L$ and the second path curvature $\kappa_H$ are combined according to $\kappa = \alpha \cdot \kappa_L + (1-\alpha) \cdot \kappa_H$; and
the first rate $\kappa'_L$ and the second rate $\kappa'_H$ are combined according to $\kappa' = \alpha \cdot \kappa'_L + (1-\alpha) \cdot \kappa'_H$.

6. The apparatus of claim 1, wherein:
to determine the at least one TTLC, the at least one processor is further configured to determine a plurality of TTLCs each based on a distance between one of the one or more points on the vehicle and one of the one or more intersection points of the at least one lane boundary; and
to activate the lane departure warning indicator, the at least one processor is further configured to compare a threshold with a combination of the plurality of TTLCs with applied weighting factors.

7. The apparatus of claim 1, wherein the one or more points on the vehicle include a left corner point, a center point, and a right corner point.

8. A vehicle comprising the apparatus according to claim 1, the vehicle further comprising:
a motor configured to drive wheels of the vehicle;
a chassis supporting axles on which the wheels are mounted;
a steering control configured to generate a steering command configured to control the wheels when the steering control is activated based on a proximity of an identified closest in path vehicle;
a brake actuator configured to actuate brakes for one or more of the wheels; and
a braking control configured to generate a braking command to control the brake actuator based on activation of the lane departure warning indicator.

9. The vehicle according to claim 8, wherein the vehicle is an electric vehicle.

10. A method, comprising:
capturing at least one image of a traffic lane in front of a vehicle using at least one camera;
detecting motion characteristics of the vehicle using an inertial measurement unit (IMU);
obtaining a vehicle motion trajectory using the IMU and based on vehicle path prediction parameters, wherein the vehicle path prediction parameters include:
first parameters for predicting a path of the vehicle, the first parameters comprising a first path curvature for predicting the path of the vehicle and a first rate of the first path curvature, and
second parameters for predicting the path of the vehicle, the second parameters comprising a second path curvature for predicting the path of the vehicle and a second rate of the second path curvature,
obtaining a vehicle vision trajectory based on the at least one image, wherein the vehicle vision trajectory includes at least one lane boundary for a segment of the traffic lane occupied by the vehicle;
determining distances between one or more points on the vehicle and one or more intersection points of the at least one lane boundary based on the obtained vehicle motion trajectory;
determining at least one time to line crossing (TTLC) based on the determined distances and a speed of the vehicle; and
activating a lane departure warning indicator based on the determined at least one TTLC.

11. The method of claim 10, wherein obtaining the vehicle motion trajectory includes:
predicting the path of the vehicle using a combination of the first parameters and the second parameters, wherein the combination is weighted based on the speed of the vehicle.

12. The method of claim 11, wherein the weighted combination weights the first parameters using a weight a and weights the second parameters using a weight $1-\alpha$.

13. The method of claim 12, wherein:
the weight $\alpha$ is applied to the first parameters for vehicle speeds below a first threshold; and
the weight $1-\alpha$ is applied to the second parameters for vehicle speeds above a second threshold.

14. The method of claim 13, wherein:
the first parameters comprise a first path curvature $\kappa_L$ and a first rate $\kappa'_L$;
the second parameters comprise a second path curvature $\kappa_H$ and a second rate $\kappa'_H$;
the first path curvature $\kappa_L$ and the second path curvature $\kappa_H$ are combined according to $\kappa = \alpha \cdot \kappa_L + (1-\alpha) \cdot \kappa_H$; and
the first rate $\kappa'_L$ and the second rate $\kappa'_H$ are combined according to $\kappa' = \alpha \cdot \kappa'_L + (1-\alpha) \cdot \kappa'_H$.

15. The method of claim 10, wherein:
determining the at least one TTLC includes determining a plurality of TTLCs each based on a distance between one of the one or more points on the vehicle and one of the one or more intersection points of the at least one lane boundary; and
activating the lane departure warning indicator includes comparing a threshold with a combination of the plurality of TTLCs with applied weighting factors.

16. The method of claim 10, wherein the one or more points on the vehicle include a left corner point, a center point, and a right corner point.

17. The method of claim 10, further comprising:
driving wheels of the vehicle with a motor;
generating a steering command to control the wheels based on activation of the lane departure warning indicator; and
generating a braking command to control a brake actuator based on activation of the lane departure warning indicator.

18. The method according to claim 17, wherein the vehicle is an electric vehicle.

* * * * *